US010642289B1

(12) United States Patent
Reeder

(10) Patent No.: US 10,642,289 B1
(45) Date of Patent: May 5, 2020

(54) CONNECTED MIXING VALVE FOR CONTROLLING WATER TEMPERATURE

(71) Applicant: Alarm.com Incorporated, Tysons, VA (US)

(72) Inventor: Alexander Lawrence Reeder, Arlington, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/941,847

(22) Filed: Mar. 30, 2018

Related U.S. Application Data

(60) Provisional application No. 62/478,862, filed on Mar. 30, 2017.

(51) Int. Cl.
*G05D 23/13* (2006.01)
*G05D 7/06* (2006.01)

(52) U.S. Cl.
CPC ....... *G05D 23/1333* (2013.01); *G05D 7/0652* (2013.01); *G05D 23/1366* (2013.01); *G05D 23/13* (2013.01)

(58) Field of Classification Search
CPC ............... G05D 23/13; G05D 23/1333; G05D 23/1366; G05D 7/0652
See application file for complete search history.

(56) References Cited

U.S. PATENT DOCUMENTS

| 4,558,817 | A | 12/1985 | Kiendl |
| 5,542,449 | A | 8/1996 | Huang |
| 5,577,660 | A | 11/1996 | Hansen |
| 5,979,776 | A | 11/1999 | Williams |
| 6,059,192 | A | 5/2000 | Zosimadis |
| 6,119,948 | A | 9/2000 | Spiegel et al. |
| 7,448,553 | B2* | 11/2008 | Schmitt ................. F16K 19/006 236/12.11 |
| 8,162,236 | B2* | 4/2012 | Rodenbeck ............. E03C 1/057 239/390 |
| 8,561,626 | B2* | 10/2013 | Sawaski ................. E03C 1/057 137/1 |
| 8,776,817 | B2* | 7/2014 | Sawaski ................. E03C 1/057 137/1 |
| 9,243,756 | B2* | 1/2016 | Davidson .................. F17D 3/00 |
| 9,632,514 | B2* | 4/2017 | Marty ...................... E03C 1/057 |
| 2002/0153425 | A1 | 10/2002 | Mountford et al. |

(Continued)

*Primary Examiner* — Matthew W Jellett
*Assistant Examiner* — Christopher D Ballman
(74) *Attorney, Agent, or Firm* — Fish & Richardson P.C.

(57) ABSTRACT

Systems and techniques are described for using a connected device that measures water usage and controls temperature of a hot water line. In some implementations, a monitoring system monitors a property that includes one or more sensors located throughout the property and generates sensor data. The monitor control unit receives sensor data and based on the sensor data, determines an action that is likely to occur. Based on the action, determine a water temperature. Generate an instruction specifying the water temperature. The monitoring system includes a connected mixing valve that connects to a hot water supply line and a cold water supply line; receives the instruction specifying the water temperature; and, determines a first amount of hot water from the hot water supply line to combine with a second amount of cold water from the cold water supply line to produce water at the water temperature.

20 Claims, 5 Drawing Sheets

(56) References Cited

U.S. PATENT DOCUMENTS

| | | | |
|---|---|---|---|
| 2003/0080194 A1* | 5/2003 | O'Hara | G05D 23/1393 236/12.12 |
| 2004/0182439 A1* | 9/2004 | Popper | E03B 7/04 137/337 |
| 2005/0004712 A1 | 1/2005 | Stevens et al. | |
| 2008/0048143 A1 | 2/2008 | Gassman et al. | |
| 2008/0110279 A1 | 5/2008 | Grueber | |
| 2010/0065764 A1 | 3/2010 | Canpolat | |
| 2014/0026970 A1 | 1/2014 | DuPlessis et al. | |

\* cited by examiner

400

```
┌─────────────────────────────────────────────────────────────┐
│  OBTAIN A SIGNATURE PROFILE ASSOCIATED WITH SHOWER DEVICE   │
│                                                         402 │
└─────────────────────────────────────────────────────────────┘
                              │
                              ▼
┌─────────────────────────────────────────────────────────────┐
│         OBTAIN SENSOR DATA FROM ONE OR MORE SENSORS         │
│                                                         404 │
└─────────────────────────────────────────────────────────────┘
                              │
                              ▼
┌─────────────────────────────────────────────────────────────┐
│  DETERMINE ADJUSTMENTS TO MIXING VALVE BASED ON THE SIGNATURE│
│            PROFILE AND THE SENSOR DATA                      │
│                                                         406 │
└─────────────────────────────────────────────────────────────┘
                              │
                              ▼
┌─────────────────────────────────────────────────────────────┐
│   ADJUST MIXING VALVE BASED ON ADJUSTMENTS FROM THE VALVE   │
│          ADJUSTMENT AND MOTOR CONTROLLER                    │
│                                                         408 │
└─────────────────────────────────────────────────────────────┘
                              │
                              ▼
┌─────────────────────────────────────────────────────────────┐
│  DETERMINE TAP RUNNING PAST ELAPSED TIME ASSOCIATED WITH    │
│          PARAMETER FROM THE SIGNATURE PROFILE               │
│                                                         410 │
└─────────────────────────────────────────────────────────────┘
                              │
                              ▼
┌─────────────────────────────────────────────────────────────┐
│ TRANSMIT COLD WATER PULSE DOWN MIXED WATER OUTPUT PIPE FOR  │
│           PREDETERMINED AMOUNT OF TIME                      │
│                                                         412 │
└─────────────────────────────────────────────────────────────┘
```

FIG. 4

CONNECTED MIXING VALVE FOR CONTROLLING WATER TEMPERATURE

CROSS-REFERENCE TO RELATED APPLICATION

This application claims the benefit of U.S. Provisional Application No. 62/478,862 filed Mar. 30, 2017, and titled "Connected Mixing Valve for Controlling Water Temperature," which is incorporated herein by reference.

TECHNICAL FIELD

This specification relates generally to water delivery technology.

BACKGROUND

Water heating is a heat transfer process that uses an energy source to heat water above its initial temperature. Typical domestic uses of hot water include cooking, cleaning, bathing, and space heating.

SUMMARY

The subject matter of the present disclosure is related to techniques for using a connected device installed in a home that measures water usage and precisely controls temperature of a hot water line in the home. For example, the connected device is configured to connect to a hot water heater in order to control and instantly change the temperature of the hot water line. The temperature may be adjusted manually at the connected device or through a mobile application or a web interface. Additionally, the connected device may be automatically adjusted based on rules that may include inputs such as outdoor temperature, indoor temperature, time of day, water flow rate, or any other measurable quantity in or outside the home. The connected device may be self-powered through the use of thermoelectric generators placed between the hot water line output and the cold water line input.

The hot water heater is often one of the largest energy users in a home and hot-water related issues may spur arguments among residents in the home. For example, a resident may get into the shower and find out no hot water remains because another resident showered first and used up all the hot water, or another resident previously ran the dishwasher or washing machine. In some implementations, hot water capacity may be increased by raising the temperature of the hot water. However, raising the temperature of the hot water may produce scalding temperatures too dangerous for the residents to handle. Connecting a connected mixing valve (CMV) at the output of the hot water heater may alleviate this issue. Specifically, residents may benefit from the increased capacity and control of the hot water heater. Additionally, introducing the CMV may eliminate a risk of legionnaire's disease, without the risk of scalding temperatures and all while reducing energy loss in piping. For example, the CMV may allow, in quick succession, a user to run the dishwasher at 115 degrees Fahrenheit (F), the shower at 105 degrees F., and the washing machine at 90 degrees F., all while maximizing the hot water capacity, reducing waste, and prioritizing the water safety of the residents in the home.

In one general aspect, a method is performed by one or more computers of a monitoring system. The method includes: receiving, from one or more sensors of a monitoring system that is configured to monitor a property, sensor data; based on the sensor data, determining, by the monitoring system, an action that is likely to occur within the property; based on the action that is likely to occur within the property, determining, by the monitoring system, a water temperature needed for the action; determining, by a connected mixing valve of the monitoring system, a first amount of hot water from the hot water supply line to combine with a second amount of cold water from the cold water supply line to produce water at the water temperature; and providing, for output by the connected mixing valve of the monitoring system, water at the water temperature by combining the first amount of hot water with the second amount of cold water.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, wherein: a sensor of the one or more sensors is located in an appliance, the monitor control unit is configured to: receive the sensor data by receiving the sensor data from the sensor located in the appliance; determine the action that is likely to occur within the property by determining that the action that is likely to be performed by the appliance; based on the sensor data, determine an appliance type of the appliance; and determine the water temperature needed for the action within the property by determining the water temperature for action of the appliance based on the appliance type.

In some implementations, the method further comprises wherein: the monitor control unit is configured to: identify a signature profile for the appliance type, the signature profile indicating a water usage pattern for the appliance type; based on the signature profile for the appliance type, determine a different water temperature to provide, for output, once a particular period of time has elapsed after providing, for output, water at the water temperature; the connected mixing valve is configured to: after the particular period of time has elapsed, provide, for output, water at the different water temperature.

In some implementations, the method further comprises wherein the monitor control unit is configured to: receive, from a manufacturer of the appliance, data indicating the signature profile for the appliance type.

In some implementations, the method further comprises wherein the monitor control unit is configured to: based on the sensor data, determine that a resident of the property is likely to perform the action; and determine the water temperature needed for the action by determining the water temperature needed for the resident of the property to perform the action.

In some implementations, the method further comprises wherein the connected mixing valve is configured to: determine that a particular period of time has elapsed since the connected mixing valve began providing water at the water temperature; based on determining that the particular period of time has elapsed since the connected mixing valve began providing water at the water temperature, provide, for output and for a period of time that is less than the particular period of time, water at a different water temperature; and after providing, for output and for the period of time that is less than the particular period of time, water at the different water temperature, provide, for output, water at the water temperature.

In some implementations, the method further comprises wherein the monitor control unit is configured to: receive data indicating that the connected mixing valve should provide water at the water temperature for the particular period of time in response to determining that the action is likely to occur; and generate the instruction specifying the water temperature by generating an instruction specifying the water temperature and the particular period of time to provide water at the water temperature.

In some implementations, the method further comprises wherein the monitor control unit is configured to: based on the sensor data, determine an additional action that is likely to occur within the property; based on the additional action that is likely to occur within the property, determine a different water temperature needed for the additional action; and generate an additional instruction specifying a higher of the water temperature and the different water temperature.

In some implementations, the method further comprises wherein: the monitor control unit is configured to: receive data indicating that an additional action is occurring within the property; the connected mixing valve being configured to: determine a third amount of hot water moving through the connected mixing valve; determine a fourth amount of cold water moving through the connected mixing valve; and determine an estimated water temperature of a combination of the third amount of hot water and the fourth amount of cold water, and the monitor control unit is configured to: receive data indicating that an additional action is occurring within the property; receive data indicating the estimated water temperature of the combination of the third amount of hot water and the fourth amount of cold water; and generate and store a signature profile for the additional action, the signature profile indicating to provide water at the estimated water temperature in response to detecting the additional action.

In some implementations, the method further comprises wherein the connected mixing valve includes: a cold water input; a hot water input that receives water from a hot water heater; a cold water output; a valve that is configured to combine cold water from the cold water input with hot water from the hot water input; and a mixed water output that outputs the combined cold water and hot water from the value.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flowchart of an example process for transmitting controlled temperature water from the connected mixing valve to a shower head device in a home.

DETAILED DESCRIPTION

Figure 1:
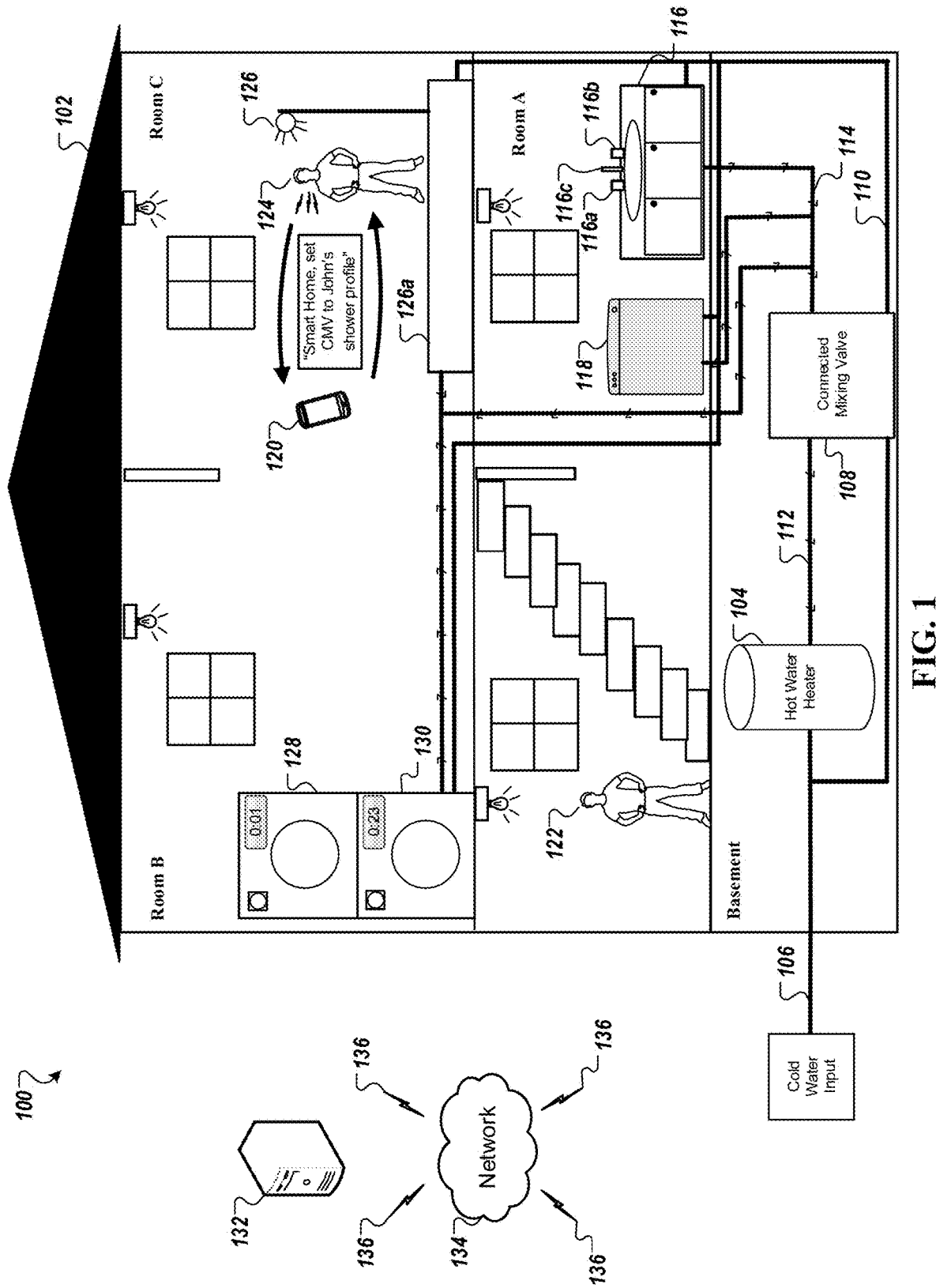
FIG. 1 is a contextual diagram of an example system for transmitting controlled temperature water from the connected mixing valve to various devices with different water requirements in a home.

FIG. 1 is a contextual diagram of an example system 100 for transmitting controlled temperature water from the connected mixing valve 108 to various home devices with various water requirements in a home. Though system 100 is shown and described including a particular set of components including a hot water heater 104, cold water input 106, connected mixing valve 108, cold water output 110, hot water output 112, mixed water output 114, connected valve application server 132, network 134, and communication links 136, the present disclosure need not be so limited. In some implementations, the connected mixing valve 108 is compatible with any hot water or cold water input and can be used with a centralized or decentralized hot water source or an on-demand hot water heater. Additionally, in some implementations only a subset of the aforementioned components may be used to transmit controlled temperature water from the connected mixing valve 108 to various devices with various water requirements in the home 102. As an example, there may be implementations that do not use the cold water output 110. Similarly, there may be implementations that the connected mixing valve 108 is integrated into the hot water heater 104, rather than shown as an after-market product in the system 100. Yet other alternative exemplary systems also fall within the scope of the present disclosure such as a system that does not use a connected valve application server 132. For these reasons, the system 100 should not be viewed as limiting the present disclosure to any particular set of necessary components.

The hot water heater 104 in system 100 obtains cold water input 106 at the house 102 from an external water supplier. The hot water heater 104 may hold a reservoir of a predetermined amount of water. For example, the reservoir may range in size from 30 to 80 gallons. The hot water heater 104 may heat the obtained cold water input 106 to a designated temperature. For example, the hot water heater 104 may heat the obtained cold water input 106 in the reservoir to 160 degrees Fahrenheit (F). In some implementations, the external water supplier may provide the cold water input 106 at a constant temperature. For example, the external water supplier may provide cold water input 106 at a constant temperature of 40 degrees F. Additionally, the cold water input 106 branches off a main line to input at the connected mixing valve 108.

In some implementations, the hot water heater 104 may be depleted of hot water capacity in response to residents using various home devices requiring hot water. For example, the dish washer 118 may require 6 gallons of hot water twice during a 15-minute period. In addition, the washing machine 128 may require 30 gallons of hot water over a period of 5 minutes. In response, the hot water capacity in the hot water heater 104 may be depleted. With a reservoir full of cold water or lukewarm water, the next resident seeking hot water from a tap will not receive hot water. Instead, the next resident will receive cold or lukewarm water. This is because the hot water heater 104 now contains a reservoir full of cold or lukewarm water and needs time to warm the cold water to a hot temperature. As a result, the user at the tap receives water closer to the temperature of the cold water input 106, rather than the desired temperature.

In some implementations, a resident such as 122 or 124 may raise the temperature in the hot water heater 104 in order to increase the total thermal capacity of the hot water heater 104 so that there is enough hot water capacity to meet all of the residents' needs. However, raising the temperature too high may produce scalding temperatures that can be dangerous if not used cautiously. For example, raising the temperature of the water in the reservoir of hot water heater 104's to 160 degrees F. may allow for all home devices to meet the desired water temperature and flow rate requirements. However, a resident such as resident 124 showering at shower head 126 may burn his or her skin causing irreparable damage.

Accordingly, a connected mixing valve 108 may be placed at the output of the hot water heater 104 to solve this issue. The connected mixing valve 108 can allow residents to increase the temperature of the hot water heater 104, thereby increasing a thermal capacity of the hot water heater 104. Additionally, the increased hot water temperature may eliminate the risk of legionnaires disease, which may be caused by bacterium found in hot water heaters and large plumbing systems, such as hot water heater 104 and plumbing systems found in house 102. Additionally, the connected mixing valve 108 may eliminate the risk of scalding temperatures while reducing energy loss in the plumbing. The method in which connected mixing valve 108 reduces energy loss in the plumbing will be further explained below.

The connected mixing valve 108 may allow the residents to control and instantly change the temperature of the mixed water output 114. For example, resident 122 may be able to run the dish washer 118 twice during a 45-minute period delivering 6 gallons of water at a constant temperature of 130 degrees F.; run the washing machine 128 for period of 25 minutes delivering 30 gallons of water at a constant temperature of 110 degrees F. over a 5-minute period, and run the faucet 116c delivering 1 to 2 gallons of water at a constant temperature of 106 degrees F., in quick succession. The connected mixing valve 108 may sequentially provide these requested water deliveries while maximizing capacity of the reservoir in hot water tank 104, reducing waste, and prioritizing safety of the residents in house 102.

In order for the connected mixing valve 108 to allow residents to control and instantly change the temperature of the mixed water output 114, the residents in home 102 may define and store signature profiles in the connected mixing valve 108. The signature profiles may be associated with each resident and allow for various use cases of the different home devices with hot and cold water lines. Each of the signature profiles can be associated with one resident, such as resident 122. For example, resident 122 may create a signature profile for one or more use cases associated with faucet 116c, dishwasher 118, washing machine 128, and any other device associated with a hot water line.

Resident 122 may store one or more parameters associated with a use case in his or her signature profile associated with the home device. Specifically, the one or more parameters for each use case may describe a hot water temperature, a scheduled start time associated with using the home device, scheduled end time with using the device, a set duration, a maximum duration, a minimum duration, timing and temperature of a cold water warning pulse, blackout periods in which a profile could not be initiated, water flow rate cancellation (reverting back to default if flow rate falls outside a certain range), under-capacity lockout (if the connected mixing valve 108 determines there is not enough hot water capacity in the reservoir of the hot water heater 104 to perform a certain use case of the signature profile), and any other parameters to describe the use case. For example, resident 122 may create a signature profile with a use case for using shower head 126. The resident 122 may define the one or more parameters to 105 degrees F. for hot water temperature, a daily scheduled start time of 7:00 AM EST, a daily end time of 7:30 AM EST, a set duration of 12 minutes or a maximum duration of 15 minutes and a minimum duration of 5 minutes as measured by the RF communicator and processor clock 210, using the flow meter 212 on the mixed water output as a start and stop for the timer, timing and temperature of a cold water warning pulse as 2 seconds and 60 degrees F. respectively to be implemented at the 12 minute mark, blackout periods in which the use case for the profile could not be initiated as from 7:30 AM EST to 8:00 AM EST, and under-capacity lockout as a particular ringer type. For example, the particular ringer type may be a noise issued by client device 120, such as a high pitched beep or single tone.

In other implementations, a signature profile may consist of any number of timing elements including, but not limited to a scheduled start time, a scheduled end time, a set duration, a maximum duration, a minimum duration, a warning pulse send time, a warning pulse duration and a dead period. The scheduled start time indicates when the output temperature of the connected mixing valve 108 changes from the default temperature to the temperature indicated by the signature profile. The output will remain at that temperature until the set duration, maximum duration or end time is reached, a warning pulse is sent or a dead period is instituted.

The timing durations may be determined by a counter operating in the RF communicator and processor 210 that starts when the flow meter 212 on the mixed water output 114 detects that water is flowing, not by the scheduled start time. For example, in a system where the default mixed water output temperature is defined as 100 degrees F., The resident 122 may define the one or more parameters to be 105 degrees F. for a hot water temperature, a daily scheduled start time of 7:00 AM EST, a daily end time of 7:30 AM EST, a maximum duration of 15 minutes and a minimum duration of 5 minutes, timing and temperature of a cold water warning pulse as 2 seconds and 60 degrees F. respectively to be implemented at the 12 minute mark, blackout periods in which the use case for the profile could not be initiated as from 7:30 AM EST to 8:00 AM EST.

In one example, if the resident 122 turns on the shower at 7:06 AM and turns off the shower at 7:09 AM, the mixed water output temperature will be 105 degrees F. from 7:00 AM until 7:11 AM. At 7:11 AM, the mixed water output temperature will revert back to the default temperature of 100 degrees F., with the minimum duration being the triggering timing element.

In one example, if the resident 122 turns on the shower at 7:06 AM and remains in the shower until 7:29 AM, the mixed water output temperature will be 105 degrees F. from 7:00 AM until 7:18 AM. At 7:18 AM, the mixed water output temperature will drop to 60 degrees for 2 seconds and then back to 105 degrees until 7:21 AM at which point, the mixed water output temperature will revert back to the default temperature of 100 degrees F., with the maximum duration being the triggering timing element.

In one example, if the resident 122 turns on the shower at 7:06 AM and turns off the shower at 7:16 AM, the mixed water output temperature will be 105 degrees F. from 7:00 AM until 7:16 AM. At 7:16 AM the mixed water output temperature will revert back to the default temperature of 100 degrees F., because the event has ended between the minimum and maximum durations.

In one example, if the resident 122 turns on the shower at 7:22 AM and turns off the shower at 7:32 AM, the mixed water output temperature will be 105 degrees F. from 7:00 AM until 7:30 AM. At 7:30 AM, the mixed water output temperature will revert back to the default temperature of 100 degrees F., with the schedule end time being the triggering timing element.

In some implementations, the flow meter 212 may be used as a trigger for initializing a timer. Specifically, the flow meter 212 may detect a specific flow rate of water for a set period of time to trigger the timer. Additionally, the flow meter 212 may detect a specific flow rate of water for a set period of time to stop the timer. The flow meter 212 may communicate with the RF communicator and processor clock 210 to communicate the flow rates over the set period of time.

In some implementations, the home devices that use water will have a signature profile. For example, a washing machine set to wash a load in warm water will fill the tumbler with water at a specific flow rate every time. It will also have a predictable time in between the various filling stages of the wash cycle. The connected mixing valve 108 can use flow rate and event-time data to recognize patterns. Specifically, when the connected mixing valve 108 determines an identifiable specific use signature profile, the connected mixing valve 108 can send a message to the client device 120 associated with the user with a confirmation question such as "Did you just finish running a load of laundry?" Once the user confirms that the signature profile identified is associated with a specific use case (e.g., laundry), the connected mixing valve 108 can attribute all future events with that use signature to laundry events.

In time, the connected mixing valve 108 will be able to identify numerous different use signatures and provide comprehensive reports to the residents outlining how their hot and cold water resources are being used. Furthermore, the connected mixing valve 108 may be able to identify signature profiles within seconds of the start of the events, or use cases, and could adjust the hot water temperature to a resident-settable temperature for that use case without having direct communication with the home device using the water. For example, the user could set the "dishwasher temperature" to 115 degrees F. As soon as it has identified that a dishwasher event has started, it could adjust the temperature of the connected mixing valve to 115 degrees F.

Additionally, a resident, such as resident 124, may interact with a client device, such as client device 120, to activate a various use case of a signature profile. The client device 120 may display a web interface, an application, or a device specific to the smart home system. The client device 120 can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 120 may communicate with the connected mixing valve 108 using the network 134 and one or more communication links 136. Alternatively, in other implementations, the client device 120 may communicate with the connected mixing valve 108 using the connected valve application server 132. In such implementations, the connected mixing valve 108 may be connected to the connected valve application server 132 using the network 134 and one or more communication links 136. The network 134 can be wired or wireless or a combination of both and can include the Internet.

In some implementations, resident 124 may communicate with the client device 120 to set a various use case of the signature profile. To illustrate, resident 124 may first instruct the connected mixing valve 108 to set a particular profile associated with the shower head 126. For example, resident 124 may use a voice command to say "Smart Home, set CMV to John's shower profile", as shown in FIG. 1. The voice command may include a phrase, such as "Smart Home" to trigger the client device 120 to actively listen to a command following the phrase. Additionally, the phrase "Smart Home" may be a predefined user configured term to communicate with the client device 120. In response, the client device 120 can send the voice command to the connected mixing valve 108 using the connected valve application server 132, the network 134, and the one or more communication link 136. The connected mixing valve 108 may retrieve John's shower profile and set the associated parameters in response to receiving the voice command. Moreover, the connected mixing valve 108 can send back a confirmation to the client device 120 in response to retrieving John's shower profile and setting the associated parameters. For example, the connected mixing valve 108 may send back a response to display a message on the client device 120 to resident 124 that says "Smart Home, CMV completed task."

Additionally, resident 124 may also request the connected mixing valve 108 to set another various use case of a signature profile. Specifically, resident 124 may set another use case of the same signature profile or resident 124 may set another use case of a new signature profile for the connected mixing valve 108. For example, resident 124 may use another voice command to say "Smart Home, set CMV to Rachel's hot laundry profile" or say "Smart Home, set CMV to Michael's shower profile." In other examples, resident 124 may adjust an already set signature profile. For example, resident 124 may use another voice command to say "Smart Home, turn up the hot water temperature by 2 degrees." In response, the connected mixing valve 108 may instantly increase the temperature of the mixed water output 114 by 2 degrees F. In some implementations, the connected mixing valve 108 may queue the received requests from a resident, in the order in which the connected mixing valve 108 receives the requests.

In some implementations, the connected mixing valve 108 may transmit water at a different temperature than the requested temperature by a resident down the pipes to ensure the temperature of water at a tap meets the requested temperature. The reason is because a common issue exists in homes that the weather outside homes affects the temperature of the pipes inside the walls. Specifically, the temperature of the pipes on colder days may be much lower than during warmer days. As a result, a tap may release colder water during colder days than during warmer days because the colder temperature of the pipes removes heat from the water during transit to the tap.

In order to alleviate this issue, the connected mixing valve 108 may transmit water at a higher or lower temperature than the requested temperature down the pipes to account for the loss or gain of heat during transit. For example, resident 124 may say "Smart Home, set CMV to Michael's shower profile," which instructs the connected mixing valve 108 to deliver water at a temperature of 105 degrees F. to the shower head 126. However, the connected mixing valve 108 has learned over the past five times of receiving the voice command "Smart Home, set CMV to Michael's shower profile", the connected mixing valve 108 immediately receives another voice command stating "Smart Home, turn up the hot water temperature by 2 degrees." In response, the next time the connected mixing valve 108 receives the voice command "Smart Home, set CMV to Michael's shower profile," the connected mixing valve 108 may raise the temperature of the mixed water output from 104 to 107 degrees F. In other implementations, the connected mixing valve 108 may prompt the resident 124 on the client device 120 with a question. Specifically, the connected mixing valve 108 may transmit a message to the client device 120 stating "Is the water temperature meeting your requirements?" The resident 124 can respond with a "Yes" or a "No" selection via interactions on the client device 120. Should the connected mixing valve 108 receive a "No" from the client device 120, the connected mixing valve 108 can transmit another message to the client device 120 stating "Please request how to adjust the water temperature." In response, the resident 124 may state "Smart Home, please raise the hot water temperature by 2 degrees." Specifically, interactions between the connected mixing valve 108 and the client device 120 may train the connected mixing valve 108 to transmit at a different temperature than the requested temperature.

The connected mixing valve 108 may automatically update parameters associated with a use case of the signature profiles when a user changes an individual parameter following setting a profile over a predetermined number of times. For example, resident 124 may say "Smart Home, set CMV to Michael's shower profile." Once the connected mixing valve 108 transmits the water down the pipe of mixed water output 114, the connected mixing valve 108 receives another voice command from a resident stating "Smart Home, turn up the hot water temperature by 2 degrees." Each time this occurs, the connected mixing valve 108 increments a counter associated with the specific use case of the signature profile. The connected mixing valve 108 compares the counter to a predetermined threshold. Should the counter exceed the predetermined threshold, the connected mixing valve 108 clears the counter, and updates the one or more parameters associated with the specific use case of the signature profile. Additionally, the connected mixing valve 108 may monitor more than one parameter associated with specific use cases of a signature profile at once.

In some implementations, the connected mixing valve 108 may provide one or more services to residents of home 102. Specifically, the connected mixing valve 108 may provide services such as hot water metering, cold water metering, water consumption per resident, water consumption per household, water use classification, and energy usage, to name a few examples. For example, the connected mixing valve 108 can provide hot water metering as a service to residents of home 102. The connected mixing valve 108 may provide the hot water metering service information to residents via the client device 120. The hot water metering service may provide usage data to the residents so they are aware of how much hot water and cold water is being used in the house. Additionally, the water metering service may provide when the hot water and cold water is being used as well as what are the peak hours for water usages. This service can also convert the estimated water usages over certain periods of time and convert the estimated water usages to estimated energy uses. The residents can benefit from this by determining how much they spend on water usage, and break this spend amount down per resident.

In some cases, the connected mixing valve 108 may communicate with the hot water heater 104 in order to allow the system to operate more efficiently. For example, if the connected mixing valve detects that the water usage in the home 102 never depletes the hot water heater capacity, it may send a message to the hot water heater 104 to turn down the hot water heater temperature, resulting in more efficient operation and reduced thermal capacity. In another instance, the connected mixing valve 108 may detect that no hot water has been used in over 24 hours and may set the hot water heater to "vacation mode" in which the temperature of the hot water heater is reduced to save energy. The connected mixing valve 108 would tell the hot water heater 104 to resume the default temperature as soon as the connected mixing valve 108 detects hot water flow again.

Yet other types of services may be provided by the connected mixing valve 108. Specifically, the usage data can be disaggregated and binned to show how much hot water and cold water is being used by the various home devices. For example, the usage data may show how much water the washing machine, the shower, the faucets use. Additionally, this binned information may be shown over resident defined periods of time. In one example, resident 122 may want to view what his or her water usage is at shower head 126 on a weekly basis. In another example, resident 124 may want to view what his or her water usage is between 7:00 AM EST and 7:30 AM EST every day of the work week and compare it to his or her water usage during those times on the weekend. In order for the connected mixing valve 108 to provide a resident 122 with his or her water usage, a sensor or a smart appliance may be placed at the distal tap. The smart appliance may provide data and/or statistics to the connected mixing valve 108 regarding an amount of water flow over a period of time. For example, a particular smart appliance, such as faucet 116c, may provide information that over a period of 24 hours, faucet 116c passed 50 gallons of water.

A smart device may also provide water temperature information to the connected mixing valve 108 using an internal temperature sensor and an RF communicator. This information can allow the connected mixing valve 108 to quantify the heat loss in the pipes and make automatic adjustments to compensate for these losses. For example, a smart washing machine 128 set to run a load at 120 degrees F. may notify the connected mixing valve 108 that the water temperature at the washing machine is at 115 degrees F. The connected mixing valve 108 may increase its output water temperature via the valve adjustment motor and motor controller 206 until the washing machine 128 reports that the desired temperature at the washing machine 128 is met. The connected mixing valve 108 may then store this setting to memory, along with pertinent information such as outdoor temperature, indoor temperature and flow rate in order to more accurately provide the correct temperature water the next time the washing machine hot load profile is used. The heat loss data may also be aggregated over time to create a water pipe heat loss model for the entire house in order to compensate for heat loss accordingly in all user profiles.

Yet other types of services may be provided by the connected mixing valve 108. Specifically, the connected mixing valve 108 can use the usage data to predict the amount of hot water capacity remaining in the reservoir of the hot water heater 104, at any given point in time. The connected mixing valve 108 may use a measured temperature of the hot water input to the connected mixing valve from the hot water output 112, the amount of hot water used in the past hour, as well as an elapsed time since the last use of the hot water heater 104. A resident may send a voice command to the connected mixing valve 108 through the client device 120 saying "Smart Home, how much hot water remains?" In response, the connected mixing valve 108 can transmit a message to the client device 120 stating "10 Liters of hot water remains using your current profile." Alternatively, the connected mixing valve 108 may be able to provide a time estimate until there is enough hot water in the tank to provide enough hot water for a specific water use profile. For example, the connected mixing valve 108 may use temperature and flow rate data collected over time to quantify the heating capacity of the hot water heater 104. The connected mixing valve 108 may then use that heating capacity data to tell the user how long it would take for the hot water heater 104 to heat enough water to take a 10-minute shower with user 122's profile based on the average hot water use for that signature profile. The connected mixing valve 108 may inform the user that it will take 15 minutes for the hot water heater 104 to heat enough water to operate in user 122's shower profile for 10 minutes without allowing the hot water temperature to fall below the specified value in user 122's profile. In other implementations, a hot water heater 104 may be able to aid the connected mixing valve 108 in the estimation of remaining hot water capacity by conveying messages to the connected mixing valve 108 about the temperature profile in the tank or the on time of the heating element after a use event.

Yet other types of services may be provided by the connected mixing valve 108. Specifically, the connected mixing valve 108 may generate notifications based on user preferences. For example, the connected mixing valve 108 may provide notifications to client device 120 regarding a status of the following inputs: water temperature from on-board temperature sensors, outdoor temperature, indoor temperature, resident inputs via voice command, during or after a water usage event such as John's shower profile, flow rate from on-board flow meters, error conditions reported by any of the components in the connected mixing valve 108, messages from other connected appliances or devices such as dishwashers, washing machines, hot water heaters, faucets bath-tubs, showers, or any other connected device connected with access to the water lines. In such implementations, the connected devices may be connected via Wi-Fi, Bluetooth, or any other protocol used to communicate over network 134 using communication links 136 to the connected mixing valve 108. Additionally, the connected mixing valve 108 may provide additional status notifications such as: notifications of a low battery in the connected mixing valve 108, low hot water capacity in the reservoir of the hot water heater 104, aberrations from normal temperatures in input water temperatures to the connected mixing valve 108 denoting a potential issue with the hot water heater 108, notifications of unusual water usage by particular water profiles, and a leak notification from either the connected mixing valve 108 or the hot water heater 104, to name a few examples. A resident, such as resident 122, may keep track of his home water usage through his client device 120 anywhere he or she goes.

Yet other types of services may be provided by the connected mixing valve 108. Specifically, the connected mixing valve 108 may minimize a temperature rise time of a pipe to condition the hot water pipe for a resident specified temperature. In a standard system, when hot water is turned on at a distal tap, the temperature of the hot water coming out of the tap starts cold as the water in the pipe is drained through the tap and replaced by hot water from the reservoir of the hot water heater 104. Then, once the sitting water in the mixed water output pipe 114 is replaced, the water temperature slowly rises as the mixed water output pipe 114 is warmed by the hot water until the water at the tap reaches its steady state temperature. The connected mixing valve 108 can transmit a short burst of extremely hot water down the line to condition the hot water pipe before turning the hot water temperature back down to the resident-specified hot water temperature. The burst temperature and duration may be set by a resident and stored in the resident's signature profile.

From the aforementioned water usage data, the connected mixing valve 108 could provide alerts to residents regarding the amount of hot water in the hot water heater 104. For example, the connected mixing valve could send an alert to a user's device when the hot water capacity in the reservoir is at 10%.

In some implementations, the connected mixing valve 108 may implement a "dead period" in which it will not allow hot water to be distributed through the valve. During this period, the mixing ratio of the valve is set to 100% cold water and 0% hot water, essentially turning the hot water line 112 into a cold water line similar to 110. This could be used as an enforcement mechanism in situations where hot water use is regulated. For example, the signature profile John's shower profile may include a 10-minute dead period after 30 minutes of continuous use or 20 gallons measured by the mixed water output 114. This would discourage the user from exceeding the 30 minutes of showering time by preventing hot water from being dispensed after the limit condition is met. Likewise, the connected mixing valve 108 may log total daily or monthly hot water use by each signature profile and cut off hot water supply to a specific signature profile once the hot water allotment has been reached. For example, a landlord who pays the utility bills may institute a monthly limit of 1000 gallons of hot water for his tenant as measured by the flow meter 212 on the hot water input line of the connected mixing valve 108. Once that limit has been reached, the connected mixing valve 108 would prevent additional hot water from being dispensed from the hot water heater 104 by the connected mixing valve 108 until the month has ended or the tenant pays a hot water overage fee. The rules regarding the dead periods may run locally on the connected mixing valve 108 or may be instituted through the network 505 through the smart home application 542.

Figure 2:
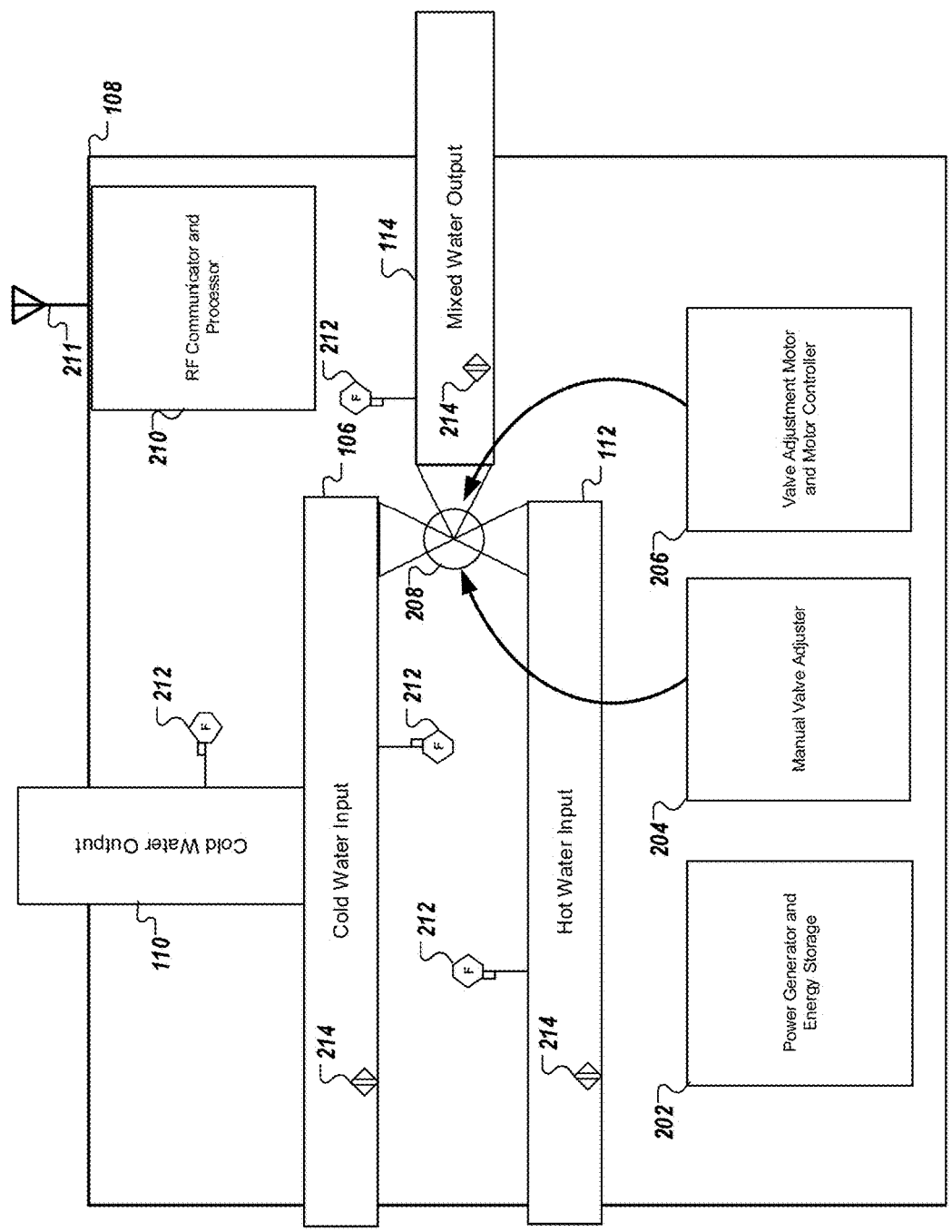
FIG. 2 is a block diagram of an example of a connected mixing valve that may utilize various components.

FIG. 2 is a block diagram of an example of a connected mixing valve that may utilize various components. The connected mixing valve 108 shown in FIG. 2 is substantially the same as the connected mixing valve 108 shown in FIG. 1.

With reference to FIG. 2, though the connected mixing valve 108 is shown and described has including a particular set of components including a cold water input pipe 106, a hot water input pipe 112, a cold water output pipe 110, a mixed water output pipe 114, a power generator and energy storage module 202, a manual valve adjuster 204, a valve adjustment motor and motor controller 206, a mixing valve 208, an RF communicator and processor 210, a flow meter 212, and a temperature sensor 214, the present disclosure need not be so limited. For instance, in some implementations, only a subset of the aforementioned components may be used to describe the mixing valve. As an example, the cold water output 110 may be an optional feature. For this example, the cold water output 110 may become the new main cold water line that distributes to other devices in the home 102. However, the cold water output is optional and may be plugged if cold water metering is not desired by the residents. For these reasons, the connected mixing valve 108 should not be viewed as limiting the present disclosure to any set of particular components.

In some implementations, the cold water input pipe 106 can be where the main water line coming from an external provider outside the home 102 is connected. Specifically, the water coming into the cold water input pipe 106 may enter the home 102 at a pressure of 50-60 pounds per square inch (psi) and distributes through the home 102. The hot water input pipe 112 can be the output pipe from the hot water heater 104. As mentioned above, the cold water output pipe 110 may be an optional feature and provides the water coming from the cold water input pipe 106 directly to home 102. The mixed water output pipe 114 can be the output of the connected mixing valve 108 and connects to hot water piping in the house 102.

In some implementations, the power generator and energy storage 202 may be a primary power source for the connected mixing valve 108. Specifically, the power generator and energy storage 202 may provide power to the connected mixing valve 108 via an external power supply or an internally generated power source. For example, the power generator and energy storage 202 may provide power to the connected mixing valve 108 using the cold water input pipe 106 and the hot water input pipe 112. One method the power generator and energy storage 202 may rely on using the cold water input pipe 106 and the hot water input pipe 112 is the seebeck effect. The seebeck effect generates power directly from a temperature delta between the water temperature in the cold water input pipe 106 and the hot water input pipe 112. The energy produced is stored in a storage device in the power generator and energy storage 202. For example, the storage device may be a battery or a super-capacitor.

In some implementations, the temperature sensors 214 may be used to take temperature readings of the cold water input pipe 106, the hot water input pipe 112, and the mixed water output pipe 114. Specifically, the temperature sensors 214 may provide the temperature readings to the RF communicator and processor 210 in any temperature format, such as celsius, kelvin, or fahrenheit. Additionally, the connected mixing valve 108 may provide the temperature readings from each of the pipes to the client device 120 in response to resident 122 requesting water pipe temperature.

In some implementations, the flow meters 212 may be used to measure a volumetric flow of water in the cold water input pipe 106, the hot water input pipe 112, and the mixed water output pipe 114. Specifically, the flow meters 212 may measure the volumetric flow using any one of a mechanical flow meter, a pressure based meter, an optical flow meter, a vortex flow meter, a sonar flow meter, an electromagnetic flow meter, or a laser Doppler flow meter. The flow meters 212 may provide the flow of water to the RF communicator and processor 210 in any volumetric format. Additionally, the connected mixing valve 108 may provide the volumetric flow readings from each of the pipes to the client device 120 in response to resident 122 requesting water flow rates.

In some implementations, the mixing valve 208 may be used to produce water at the mixed water output 114 between the hot and cold input temperatures. Specifically, the mixing valve 208 can receive two inputs, namely the water flow from the cold water input 106 and the hot water input 112, and produce one mixed water output 114 to distribute to the home 102. The mixing valve 208 may adjust a valve mixing ratio between the water flow from the cold water input pipe 106 and the hot water input pipe 112. For example, the mixing valve 208 may create a valve mixing ratio of 15% water flow from the cold water input pipe 106 and 85% water flow from the hot water input pipe 112 to give a mixing valve ratio of 17/3, or water flow from hot water input pipe 112 over water flow from the cold water input pipe 106. In some implementations, the valve mixing ratio may be controlled by the valve adjustment motor and motor controller 206 and the manual valve adjuster 204.

In some implementations, the RF communicator and processor 210 may be the central processing unit behind the connected mixing valve 108. Specifically, the RF communicator and processor 210 may gather sensory input data and implement the processing of the sensory input data to distribute water at a particular temperature throughout home 102 using an actuator of the valve adjustment motor and motor controller 206. Specifically, the RF communicator and processor 210 stores the signature profiles, receives requests from residents to retrieve and load the stored signature profiles, and communicates all notifications to the client device 120 via an antenna 211. Additionally, the RF communicator and processor 210 can be powered by the power generator and energy storage 202. In some implementations, the RF communicator and processor 210 may receive status notifications regarding components of the connected mixing valve 108 and other connected devices in home 102 and communicate notifications to the client device 120.

In some implementations, the valve adjustment motor and motor controller 206 can be a motor and controller powered by the power generator and energy storage 202. The RF communicator and processor 210 can instruct the valve adjust motor and motor controller 206 to adjust the mixing valve 208 according to the valve mixing ratio. In response, the valve adjustment motor and motor controller 206 may rotate a gear or adjust a flow apparatus of the mixing valve 208 to meet the desired valve mixing ratio. In another example, resident 122 may send a voice command to client device 120 to say "Smart Home, set CMV mixing valve to 80% hot and 20% cold." The RF communicator and processor 210 can receive the voice command and communicate with the manual valve adjuster 204 or the valve adjustment motor and motor controller 206 to adjust the valve mixing ratio of the mixing valve 208.

In some implementations, the manual valve adjuster 204 can be a manual adjuster for the mixing valve 208. Specifically, the manual valve adjuster 204 allows a user to manually adjust the valve mixing ratio associated with the mixing valve 208. For example, the manual valve adjuster 204 may be a rotary knob. The manual valve adjuster 204 may be used in case the power generator and energy storage 202 fails or the power fails in the home 102.

Figure 3:
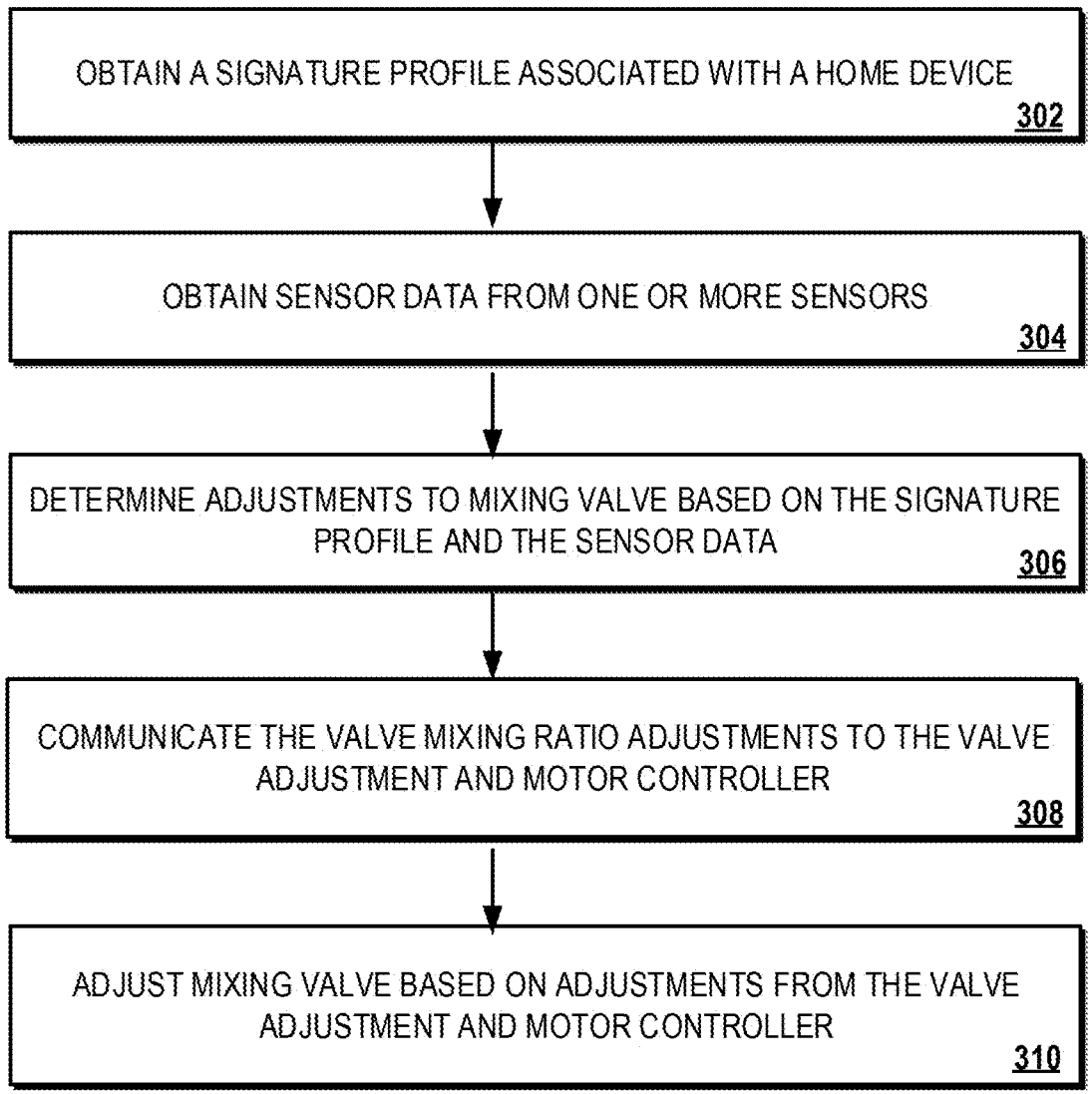
FIG. 3 is a flowchart of an example process for transmitting controlled temperature water from the connected mixing valve to various devices with different water requirements in a home.

FIG. 3 is a flowchart of a process for transmitting controlled temperature water from the connected mixing valve to various devices with different water requirements in a home. Generally, the process 300 includes obtaining a signature profile associated with a home device, obtaining sensor data from one or more sensors, determine adjustments to mixing valve based on the signature profile and the sensor data, communicate the valve mixing ratio adjustments to the valve adjustment and motor controller 206, and adjust the mixing valve based on the adjustments from the valve adjustment and motor controller 206.

In more detail, during 302, a computer such as the RF communicator and processor 210 may obtain a signature profile associated with a home device. Specifically, the RF communicator and processor 210 may receive a voice command from resident 122 stating "Smart Home, set CMV to John's shower profile." In response, the RF communicator and processor 210 obtains John's signature profile from memory and retrieves the use case, showering, from John's signature profile and the associated parameters. For example, John's signature profile may describe a hot water temperature of 105 degrees F., a scheduled start time of 7:00 AM EST, a scheduled end time of 7:30 PM EST, a set duration of 12 minutes, a maximum duration of 15 minutes, a minimum duration of 5 minutes, timing and temperature of a cold water warning pulse as 2 second and 60 degrees F. respectively to be implemented at the 12 minute mark, blackout periods in which the use case for John's shower profile could not be initiated from 7:30 AM EST to 8:00 AM EST, and under-capacity lockout as a particular ringer type, such as a beep played by client device 120.

During 304, the RF communicator and processor 210 may obtain sensor data from one or more sensors. Specifically, the RF communicator and processor 210 may obtain data from water temperature from the temperature sensors 214, outdoor temperature using outdoor sensors not shown in figures, indoor temperature using sensors not shown in figures, flow rate from each of the flow meters 212, and hot water capacity in reservoir of hot water heater 104, to name a few examples. Additionally, the RF communicator and processor 210 may retrieve a last set signature profile to determine if the last profile is the same as the newly requested signature profile.

During 306, the RF communicator and processor 210 may determine adjustments to the mixing valve 208 based on the retrieved signature profile and the obtained sensor data. For example, the RF communicator and processor 210 may determine the valve mixing ratio of the mixing valve is currently set to 50% hot and 50% cold, whereas the new mixing valve ratio associated with John's shower profile is set to 80% hot and 20% cold. In order to make adjustments, the RF communicator and processor 210 must increase the hot water percentage by 30% and decrease the cold water percentage by 30%. In other implementations, the RF communicator and processor 210 may determine adjustments to the mixing valve 208 based on a mixed water output temperature and one or more sensors, such as an outdoor temperature sensor.

During 308, the RF communicator and processor 210 communicates the valve mixing ratio adjustments to the valve adjustment and motor controller 206. Specifically, the RF communicator and processor 210 communicates to the valve adjustment and motor controller 206 to increase the hot water percentage by 30% to adjust the mixing valve ratio. In some implementations, the RF communicator may communicate to the valve adjustment and motor controller 206 a message of a mixing valve ratio adjustment over a physically connected bus.

During 310, the valve adjustment and motor controller 206 receives the message of the mixing valve ratio adjustment and adjusts the mixing valve 208 based on the message. Specifically, the valve adjustment and motor controller 206 parses the message to determine an amount of to adjust the one or more valves associated with the mixing valve 208. In some implementations, the valve adjustment and motor controller 206 adjusts a valve associated with the mixing valve 208 for the hot water input pipe 112 by the amount described in the received message. In response, adjusting that valve associated with the hot water input pipe 112, adjusts another valve associated with the cold water input pipe 106 in the opposite direction by an amount equal in magnitude. For example, the valve adjustment and motor controller 206 opens the valve associated with the hot water input pipe 112 by 30% and in response, the mixing valve closes the valve associated with the cold water input pipe 106 by 30%. In other implementations, the valve adjustment motor controller 206 open the valve associated with the hot water input pipe 112 by 30% and must also close the valve associated with the cold water input pipe 106 by 30%. In response to adjusting the one or more valves associated with the mixing valve 208, the mixed water output pipe 114 flows water at a desired temperature based on the parameters described in the signature profile. In other implementations, a PID controller, in the RF communicator and processor 210, may be utilized to ensure a static temperature is maintained at the output of the mixing valve 208.

FIG. 4 is a flowchart of a process for transmitting controlled temperature water from the connected mixing valve to a shower head device in a home. Generally, the process 400 is substantially similar to process 300. Specifically, the process 400 includes obtaining a signature profile associated with a shower device, obtaining sensor data from one or more sensors, determine adjustments to mixing valve based on the signature profile and the sensor data, adjust the mixing valve based on the adjustments from the valve adjustment and motor controller 206, determine tap running past elapsed time associated with a parameter from the signature profile, and transmit a cold water pulse down the mixed water output pipe for a predetermined amount of time.

During 402, similar to 302, the RF communicator and processor 210 may obtain a signature profile associated with a shower device, such as shower head 126. Specifically, the RF communicator and processor 210 may receive a voice command from resident 122 stating "Smart Home, set CMV to John's shower profile." In response, the RF communicator and processor 210 obtains John's signature profile from memory and retrieves the use case, showering, from John's signature profile and the associated parameters for the shower head 126. For example, John's signature profile may describe a hot water temperature of 105 degrees F., a scheduled start time of 7:00 AM EST, a scheduled end time of 7:30 PM EST, a set duration of 12 minutes, a maximum duration of 15 minutes, a minimum duration of 5 minutes, timing and temperature of a cold water warning pulse as 2 seconds and 60 degrees F. respectively to be implemented at the 12 minute mark, blackout periods in which the use case for John's shower profile could not be initiated from 7:30 AM EST to 8:00 AM EST, and under-capacity lockout as a particular ringer type, such as a beep transmitted to client device 120.

During 404, similar to 304, the RF communicator and processor 210 may obtain sensor data from one or more sensors. Specifically, the RF communicator and processor 210 may obtain data from water temperature from the temperature sensors 214, outdoor temperature using outdoor sensors not shown in figures, indoor temperature using sensors not shown in figures, flow rate from each of the flow meters 212, and hot water capacity in reservoir of hot water heater 104, to name a few examples. Additionally, the RF communicator and processor 210 may retrieve a last set signature profile to determine if the last profile is the same as John's signature profile for showering.

During 406, similar to 306, the RF communicator and processor 210 may determine adjustments to the mixing valve 208 based on the retrieved signature profile and the obtained sensor data. For example, the RF communicator and processor 210 may determine the valve mixing ratio of the mixing valve is currently set to 50% hot and 50% cold, whereas the new mixing valve ratio associated with John's shower profile is set to 80% hot and 20% cold. In order to make adjustments, the RF communicator and processor 210 must increase the hot water percentage by 30% and decrease the cold water percentage by 30%. In other implementations, the RF communicator and processor 210 may determine adjustments to the mixing valve 208 based on a mixed water output temperature and one or more sensors, such as an indoor temperature sensor.

During 408, similar to combined 308 and 310, the valve adjustment and motor controller 206 receives a message of the mixing valve ratio adjustment from the RF processor and communicator 210 and adjusts the mixing valve 208 based on the message. Specifically, the valve adjustment and motor controller 206 parses the message to determine an amount of to adjust the one or more valves associated with the mixing valve 208.

During 410, the RF processor and communicator 210 monitors a timer while the signature profile is active. For example, the RF processor and communicator 210 starts a timer when the retrieved signature profile is activated and water is transmitted to the shower head 126. The RF processor and communicator 210 compares the timer amount to the maximum duration time parameter in John's signature profile. If the timer amount is greater than the maximum duration time and the retrieved signature profile is still active, then in 412, the RF processor and communicator 210 communicates to the valve adjustment motor and motor controller 206 to transmit the cold water warning pulse. Specifically, the cold water warning pulse instructs the valve adjustment motor and motor controller 206 to 80%-100% close the valve associated with the hot water input pipe 112 and 80%-100% open the valve associated with the cold water input pipe 106 to let 80%-100% of the cold water flow to the shower head 126 for a 2-5 second duration. The amount of cold water flow to let through may be pre-configured by a resident. This cold water warning pulse warns the user he or she has surpassed the maximum expected duration time for a shower according to the signature profile.

Figure 5:
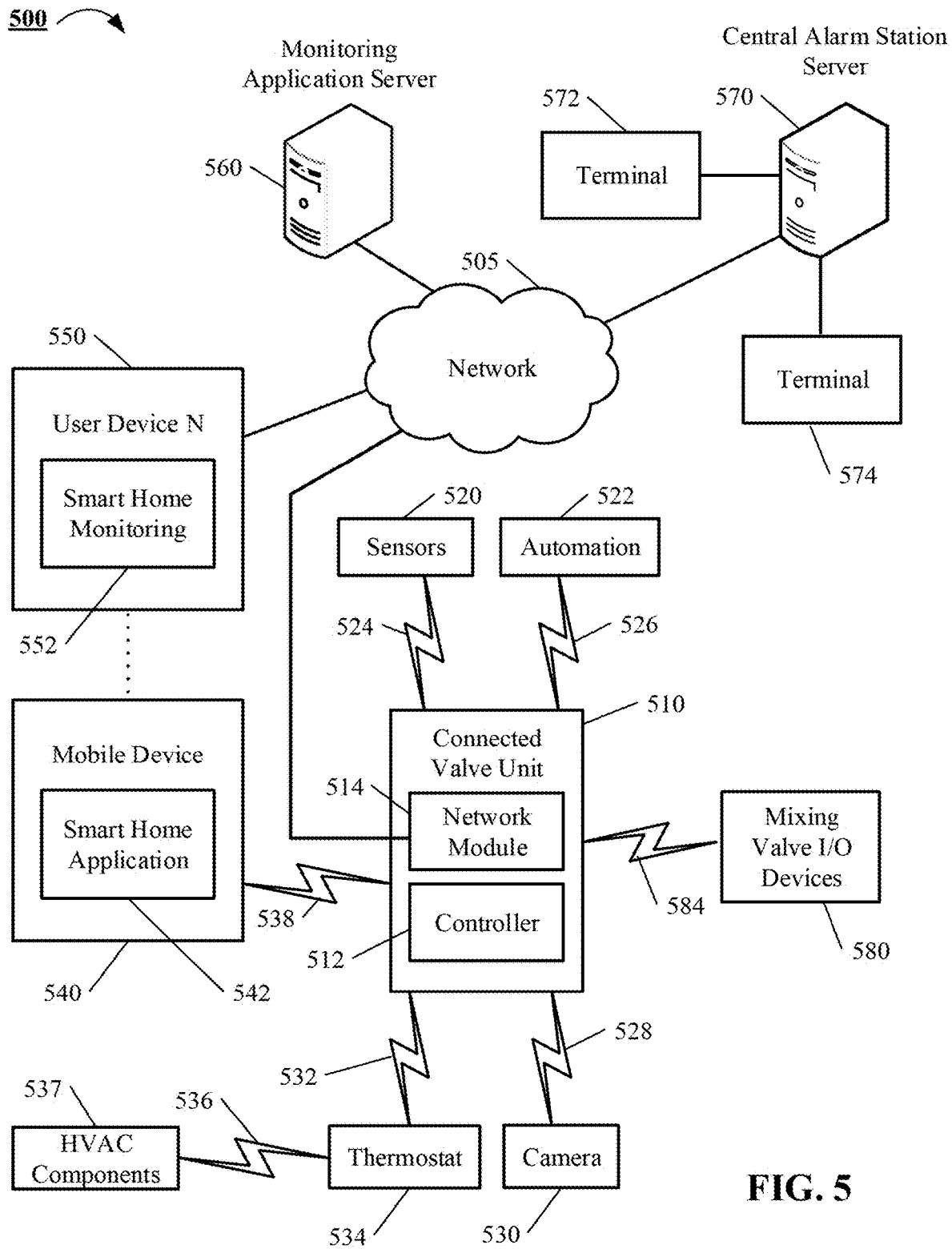
FIG. 5 is a block diagram of an example of a connected mixing valve system that may utilize connected mixing valve components.

FIG. 5 is a block diagram of an example of a connected mixing valve system 500 that may utilize connected mixing valve components to provide instant hot water control in a home 102. The electronic system 500 includes a network 505, a connected valve unit 510, one or more user devices 540 and 550, a monitoring application server 560, and a central alarm station server 570. In some examples, the network 505 facilitates communications between the connected valve unit 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the connected valve unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The connected valve unit 510 includes a controller 512 and a network module 514. The controller 512 is configured to control a connected mixing valve system (e.g., a connected mixing valve or hot water control system) that includes the connected valve unit 510. In some examples, the controller 512 may include a processor or other control circuitry configured to execute instructions of a program that controls operation of a hot water control system. In these examples, the controller 512 may be configured to receive input from sensors, flow meters, or other devices included in the hot water control system and control operations of devices included in the household (e.g., a shower head, a faucet, a dishwasher, etc.). For example, the controller 512 may be configured to control operation of the network module 514 included in the connected valve unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the connected valve unit 510 to communicate over a local area network and/or the Internet. The network module 514 also may be a voiceband modem configured to enable the alarm panel to communicate over the telephone lines of Plain Old Telephone Systems (POTS).

The hot water control system that includes the connected valve unit 510 includes one or more sensors. For example, the monitoring system may include multiple sensors 520. The sensors 520 may include a temperature sensor, a flow rate sensor, a leaking sensor, or any other type of sensor included in a hot water control system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The connected valve unit 510 communicates with the automation module 522 and the camera 530 to perform monitoring. The automation module 522 is connected to one or more devices that enable home automation control. For instance, the automation module 522 may be connected to one or more lighting systems and may be configured to control operation of the one or more lighting systems. Also, the automation module 522 may be connected to one or more electronic locks at the property and may be configured to control operation of the one or more electronic locks (e.g., control Z-Wave locks using wireless communications in the Z-Wave protocol. Further, the automation module 522 may be connected to one or more appliances at the property and may be configured to control operation of the one or more appliances. The automation module 522 may include multiple modules that are each specific to the type of device being controlled in an automated manner. The automation module 522 may control the one or more devices based on commands received from the connected valve unit 510. For instance, the automation module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a hot water heater 104 monitored by the connected valve unit 510. The camera 530 may be configured to capture single, static images of the area and also video images of the area in which multiple images of the area are captured at a relatively high frequency (e.g., thirty images per second). The camera 530 may be controlled based on commands received from the connected valve unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the connected valve unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the connected valve unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the connected valve unit 510 and can control the environmental (e.g., temperature) settings based on commands received from the connected valve unit 510.

In some implementations, the thermostat 534 is a dynamically programmable thermostat and can be integrated with the connected valve unit 510. For example, the dynamically programmable thermostat 534 can include the connected valve unit 510, e.g., as an internal component to the dynamically programmable thermostat 534. In addition, the connected valve unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more mixing valve devices 580. The one or more mixing valve devices may include any type of device used to produce an output water stream from a hot water input pipe and a cold water input pipe. For instance, the one or more mixing valve devices 580 may include one or more adjustable valves associated with each input pipe. Additionally, the one or more mixing valve devices 580 may include an output valve that mixes water coming from the hot water input pipe and the cold water input pipe according to a valve mixing ratio. Furthermore, the one or more mixing valve devices 580 may receive input from any of sensors 520.

The sensors 520, the module 522, the camera 530, the thermostat 534, and the mixing valve devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the mixing valve devices 580 to the controller 512. The sensors 520, the module 522, the camera 530, the thermostat 534, and the mixing valve devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the mixing valve devices 580 and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the connected valve unit 510, the one or more user devices 540 and 550, and the central alarm station server 570 over the network 505. For example, the monitoring application server 560 may be configured to monitor events (e.g., alarm events) generated by the connected valve unit 510. In this example, the monitoring application server 560 may exchange electronic communications with the network module 514 included in the connected valve unit 510 to receive information regarding events (e.g., hot water control events) detected by the connected mixing valve 108. The monitoring application server 560 also may receive information regarding events (e.g., hot water control events) from the one or more user devices 540 and 550.

In some examples, the monitoring application server 560 may route hot water control data received from the network module 514 or the one or more user devices 540 and 550 to the central alarm station server 570. For example, the monitoring application server 560 may transmit the hot water control data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the connected valve unit 510 or the one or more user devices 540 and 550.

The central alarm station server 570 is an electronic device configured to provide alarm monitoring service by exchanging communications with the connected valve unit 510, the one or more mobile devices 540 and 550, and the monitoring application server 560 over the network 505. For example, the central alarm station server 570 may be configured to monitor hot water control events generated by the connected valve unit 510. In this example, the central alarm station server 570 may exchange communications with the network module 514 included in the connected valve unit 510 to receive information regarding hot water control events detected by the connected valve unit 510. The central alarm station server 570 also may receive information regarding hot water control events from the one or more mobile devices 540 and 550 and/or the monitoring application server 560.

The central alarm station server 570 is connected to multiple terminals 572 and 574. The terminals 572 and 574 may be used by operators to process hot water control events. For example, the central alarm station server 570 may route hot water control data to the terminals 572 and 574 to enable an operator to process the hot water control data. The terminals 572 and 574 may include general-purpose computers (e.g., desktop personal computers, workstations, or laptop computers) that are configured to receive hot water control data from a server in the central alarm station server 570 and render a display of information based on the hot water control data. For instance, the controller 512 may control the network module 514 to transmit, to the central alarm station server 570, hot water control data indicating that a sensor 520 detected a flow rate of water in the hot water input pipe 112. The central alarm station server 570 may receive the hot water control data and route the hot water control data to the terminal 572 for processing by an operator associated with the terminal 572. The terminal 572 may render a display to the operator that includes information associated with the hot water control event (e.g., the flow rate, the pipe the flow rate came from, the temperature of the water in the pipe, etc.) and the operator may handle the hot water control event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the connected valve unit 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the connected valve unit 510 using the communication link 538. For instance, the one or more user devices 540 and 550 may communicate with the connected valve unit 510 using various local wireless protocols such as Wi-Fi, Bluetooth, Zwave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the connected valve unit 510, the one or more user devices 540 and 550 may communicate directly with the sensors and other devices controlled by the connected valve unit 510. In some implementations, the one or more user devices 540 and 550 replace the connected valve unit 510 and perform the functions of the connected valve unit 510 for local monitoring and long range/offsite communication.

In other implementations, the one or more user devices 540 and 550 receive monitoring system data captured by the connected valve unit 510 through the network 505. The one or more user devices 540, 550 may receive the data from the connected valve unit 510 through the network 505 or the monitoring application server 560 may relay data received from the connected valve unit 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the connected valve unit 510 directly (e.g., through link 538) or through the monitoring application server 560 (e.g., through network 505) based on a location of the one or more user devices 540 and 550. For instance, when the one or more user devices 540 and 550 are located close to the connected valve unit 510 and in range to communicate directly with the connected valve unit 510, the one or more user devices 540 and 550 use direct communication. When the one or more user devices 540 and 550 are located far from the connected valve unit 510 and not in range to communicate directly with the connected valve unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, and the camera 530. The one or more user devices 540 and 550 receive data directly from the sensors 520, the module 522, and the camera 530 and sends data directly to the sensors 520, the module 522, and the camera 530. The one or more user devices 540, 550 provide the appropriate interfaces/processing to provide visual surveillance and reporting.

In other implementations, the system 500 further includes network 505 and the sensors 520, the module 522, the camera 530, and the thermostat 534 are configured to communicate sensor and image data to the one or more user devices 540 and 550 over network 505 (e.g., the Internet, cellular network, etc.). In yet another implementation, the sensors 520, the module 522, the camera 530, and the thermostat 534 (or a component, such as a bridge/router) are intelligent enough to change the communication pathway from a direct local pathway when the one or more user devices 540 and 550 are in close physical proximity to the sensors 520, the module 522, the camera 530, and the thermostat 534 to a pathway over network 505 when the one or more user devices 540 and 550 are farther from the sensors 520, the module 522, the camera 530, and the thermostat 534. In some examples, the system leverages GPS information from the one or more user devices 540 and 550 to determine whether the one or more user devices 540 and 550 are close enough to the sensors 520, the module 522, the camera 530, and the thermostat 534 to use the direct local pathway or whether the one or more user devices 540 and 550 are far enough from the sensors 520, the module 522, the camera 530, and the thermostat 534 that the pathway over network 505 is required. In other examples, the system leverages status communications (e.g., pinging) between the one or more user devices 540 and 550 and the sensors 520, the module 522, the camera 530, and the thermostat 534 to determine whether communication using the direct local pathway is possible. If communication using the direct local pathway is possible, the one or more user devices 540 and 550 communicate with the sensors 520, the module 522, the camera 530, and the thermostat 534 using the direct local pathway. If communication using the direct local pathway is not possible, the one or more user devices 540 and 550 communicate with the sensors 520, the module 522, the camera 530, and the thermostat 534 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
a water flow meter that is located at the property and that is configured to generate water usage data of the property;
a monitor control unit that is configured to:
  receive the water usage data;
  based on the water usage data, determine an appliance at the property that is likely consuming water;
  based on determining that the appliance at the property is likely consuming water, determine a water temperature needed for the appliance; and
  generate an instruction specifying the water temperature; and
a connected mixing valve that is connected to a hot water supply line and a cold water supply line and that is configured to:
  receive the instruction specifying the water temperature;
  determine a first amount of hot water from the hot water supply line to combine with a second amount of cold water from the cold water supply line to produce water at the water temperature; and
  provide, for output, water at the water temperature by combining the first amount of hot water with the second amount of cold water.

2. The system of claim 1, wherein:
the water flow meter is located in the appliance, and
the monitor control unit is configured to:
  based on the water usage data, determine an action of the appliance; and
  determine the water temperature needed for the appliance by determining the water temperature for the action of the appliance.

3. The system of claim 1, wherein the monitor control unit is configured to:
  based on the water usage data, determine a first signature profile that reflects a water usage pattern of the property;
  determine that the first signature profile corresponds to a second signature profile of the appliance that reflects a water usage pattern for the appliance; and
  determine that the appliance at the property is likely consuming water based further on determining that the first signature profile corresponds to a second signature profile.

4. The system of claim 3, wherein the monitor control unit is configured to:
  receive, from a manufacturer of the appliance, data indicating the signature profile for the appliance.

5. The system of claim 1, comprising:
a sensor that is located at the property and that is configured to generate sensor data that reflects an attribute of the property,
wherein the monitor control unit is configured to:
  determine that the appliance at the property is likely consuming water based further on the sensor data.

6. The system of claim 1, wherein the connected mixing valve is configured to:
  determine that a particular period of time has elapsed since the connected mixing valve began providing water at the water temperature;
  based on determining that the particular period of time has elapsed since the connected mixing valve began providing water at the water temperature, provide, for output and for a period of time that is less than the particular period of time, water at a different water temperature; and after providing, for output and for the period of time that is less than the particular period of time, water at the different water temperature, provide, for output, water at the water temperature.

7. The system of claim 6, wherein the monitor control unit is configured to:
receive data indicating that the connected mixing valve should provide water at the water temperature for the particular period of time in response to determining that the appliance at the property is likely consuming water; and
generate the instruction specifying the water temperature by generating an instruction specifying the water temperature and the particular period of time to provide water at the water temperature.

8. The system of claim 1, wherein the monitor control unit is configured to:
based on the water usage data, determine an additional appliance at the property that is likely consuming water;
based on determining that the additional appliance at the property is likely consuming water, determine a different water temperature needed for the additional appliance; and
generate an additional instruction specifying a higher of the water temperature and the different water temperature.

9. The system of claim 1, wherein:
the monitor control unit is configured to:
receive data indicating that an action is occurring within the property, the connected mixing valve being configured to:
determine a third amount of hot water moving through the connected mixing valve;
determine a fourth amount of cold water moving through the connected mixing valve; and
determine an estimated water temperature of a combination of the third amount of hot water and the fourth amount of cold water, and
the monitor control unit is configured to:
receive data indicating the estimated water temperature of the combination of the third amount of hot water and the fourth amount of cold water; and
generate and store a signature profile for the action, the signature profile indicating to provide water at the estimated water temperature in response to detecting the action.

10. The system of claim 1, wherein the connected mixing valve includes:
a cold water input;
a hot water input that receives water from a hot water heater;
a cold water output;
a valve that is configured to combine cold water from the cold water input with hot water from the hot water input; and
a mixed water output that outputs the combined cold water and hot water from the value.

11. A computer-implemented method, comprising:
receiving, from water flow meter that is located at a property, water usage data of the property;
based on the water usage data, determining, by the monitoring system, an appliance at the property that is likely consuming water;
based on determining that the appliance at the property is likely consuming water, determining, by the monitoring system, a water temperature needed for the appliance;
determining, by a connected mixing valve of the monitoring system, a first amount of hot water from the hot water supply line to combine with a second amount of cold water from the cold water supply line to produce water at the water temperature; and
providing, for output by the connected mixing valve of the monitoring system, water at the water temperature by combining the first amount of hot water with the second amount of cold water.

12. The computer-implemented method of claim 11, comprising:
based on the water usage data, determining, by the monitoring system, an action of the appliance; and
determining, by the monitoring system, the water temperature needed for the appliance by determining the water temperature for the action of the appliance.

13. The computer-implemented method of claim 11, comprising:
based on the water usage data, determining, by the monitoring system, a first signature profile that reflects a water usage pattern of the property;
determining, by the monitoring system, that the first signature profile corresponds to a second signature profile of the appliance that reflects a water usage pattern for the appliance; and
determining, by the monitoring system, that the appliance at the property is likely consuming water based further on determining that the first signature profile corresponds to a second signature profile.

14. The computer-implemented method of claim 13, comprising:
receiving, by the monitoring system, data indicating the signature profile for the appliance from a manufacturer of the appliance.

15. The computer-implemented method of claim 11, comprising:
receiving, by the monitoring system and from a sensor located at the property, sensor data that reflects an attribute of the property,
wherein determining that the appliance at the property is likely consuming water is based on further on the sensor data.

16. The computer-implemented method of claim 11, comprising:
determining, by the connected mixing valve, that a particular period of time has elapsed since the connected mixing valve began providing water at the water temperature;
based on determining that the particular period of time has elapsed since the connected mixing valve began providing water at the water temperature, providing, by the connected mixing valve, water at a different water temperature for output and for a period of time that is less than the particular period of time; and
after providing water at the different water temperature for output and for the period of time that is less than the particular period of time, providing, by the connected mixing valve, water at the water temperature for output.

17. The computer-implemented method of claim 16, comprising:
receiving, by the monitoring system, data indicating that the connected mixing valve should provide water at the water temperature for the particular period of time in response to determining that the appliance at the property is likely consuming water; and generating, by the monitoring system, the instruction specifying the water temperature by generating an instruction specifying the water temperature and the particular period of time to provide water at the water temperature.

18. The computer-implemented method of claim 11, comprising:

based on the water usage data, determining, by the monitoring system, an additional appliance at the property that is likely consuming water;

based on determining that the additional appliance at the property is likely consuming water, determining, by the monitoring system, a different water temperature needed for the additional appliance; and generating, by the monitoring system, an additional instruction specifying a higher of the water temperature and the different water temperature.

19. The computer-implemented method of claim 11, comprising:

receiving, by the monitoring system, data indicating that an action is occurring within the property;

determining, by the connected mixing valve, a third amount of hot water moving through the connected mixing valve;

determining, by the connected mixing valve, a fourth amount of cold water moving through the connected mixing valve;

determining, by the connected mixing valve, an estimated water temperature of a combination of the third amount of hot water and the fourth amount of cold water;

receiving, by the monitoring system, data indicating the estimated water temperature of the combination of the third amount of hot water and the fourth amount of cold water;

generating, by the monitoring system, a signature profile for the action; and storing, by monitoring system, the signature profile for the action, the signature profile indicating to provide water at the estimate water temperature in response to detecting the action.

20. The computer-implemented method of claim 11, wherein the connected mixing valve includes:

a cold water input;

a hot water input that receives water from a hot water heater;

a cold water output;

a valve that is configured to combine cold water from the cold water input with hot water from the hot water input; and a mixed water output that outputs the combined cold water and hot water from the value.

* * * * *